No. 869,116. PATENTED OCT. 22, 1907.
C. E. WADE.
MANUFACTURE OF ARTIFICIAL LUMBER.
APPLICATION FILED JUNE 13, 1905.
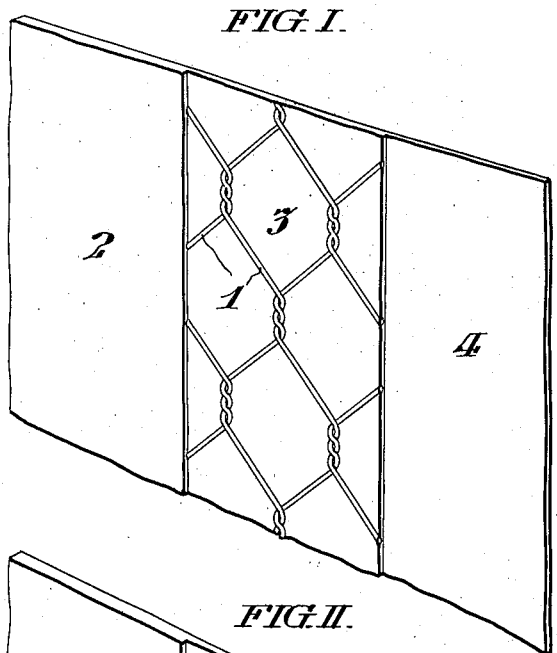
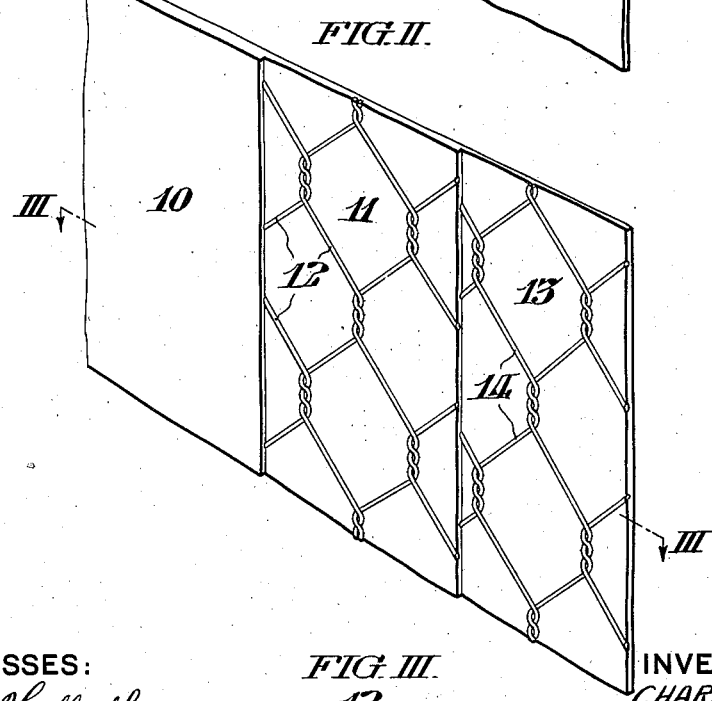
WITNESSES:
INVENTOR:
CHARLES E. WADE,

UNITED STATES PATENT OFFICE.

CHARLES E. WADE, OF NORTH WALES, PENNSYLVANIA, ASSIGNOR TO KEASBEY & MATTISON COMPANY, OF AMBLER, PENNSYLVANIA, A CORPORATION OF PENNSYLVANIA.

MANUFACTURE OF ARTIFICIAL LUMBER.

No. 869,116. Specification of Letters Patent. Patented Oct. 22, 1907.

Application filed June 13, 1905. Serial No. 264,989.

*To all whom it may concern:*

Be it known that I, CHARLES E. WADE, a citizen of the United States, residing at North Wales, in the county of Montgomery and State of Pennsylvania, have invented certain new and useful Improvements in the Manufacture of Artificial Lumber, whereof the following is a specification, reference being had to the accompanying drawings.

My improvements relate to artificial lumber which is formed by combining fibrous material such as asbestos with hydraulic cement, and consists in embedding in said lumber during the process of its manufacture, a mesh of wire whereby its strength durability and flexibility is materially increased.

In the accompanying drawings, Figure I, represents a flat piece of artificial lumber embodying my invention, certain portions being broken away so as to show the structure. Fig. II, represents the same in a modified form, and, Fig. III, represents a sectional view taken on the line III, III, in Fig. II.

In United States Letters Patent #769,078, dated August 30th, 1904, and granted to Ludwig Hatschek, there is fully described a process of making artificial lumber of the character to which my invention relates. Without giving in full the details of that process, it is sufficient to here explain that fibrous material such as asbestos combined with hydraulic cement in a watery mixture is fed into a machine analogous to a paper machine by which successive layers of the resulting pulp are superimposed by winding upon a roller until the proper thickness has been secured. The composite cylindrical structure is then slit and removed from the roller, flattened and subjected to extreme pressure, and when dried forms the exceedingly hard and durable structural material now commonly known as artificial lumber.

My present invention consists in combining with such lumber a wire mesh embedded in its structure. In this way the strength of the lumber is increased, and it becomes possible to use for structural purposes thinner layers or slabs of the lumber than could otherwise be employed.

The wire mesh may be of any ordinary form, but I have shown in the drawings at 1, the ordinary commercial wire mesh which I prefer to employ. This is embedded in the material during the process of its formation as follows:—A piece of mesh is cut of sufficient size to cover the periphery of the roller on which the lumber is formed, without any overlapping of its edges. If but one mesh is to be placed in the lumber, the layers of pulp are allowed to run onto the roller until about half of the desired depth of material has been formed. Then during the succeeding rotation of the roller the wire is fed into place passing around the roller beneath the layer of pulp which is being applied. Thereafter, the rotation of the roller and the superimposition of further successive layers proceeds as before until the desired depth of material has been attained. In ordinary practice the roller of the machine has a groove extending lengthwise of its periphery for the purpose of guiding a knife by which at the conclusion of the process the cylinder of material which has been formed is cut from the roller. When the wire mesh is fed onto the roller it is placed so that the edges of the mesh will meet along the line of this groove, so that when the material is cut from the roller it will not be necessary to cut any of the mesh. The material thus slit and taken from the roller is flattened out and placed under a press where it is subject to heavy pressure. When dried it is exceedingly hard and strong and durable. In Fig. I, I have shown a portion of a slab of this material, parts being broken away to show the structure. At 2, the full thickness of the material is shown, and at 3, one side has been removed to expose the embedded mesh. At 4, the mesh has been removed leaving only the remaining side of the material.

Instead of embedding but one wire mesh, two or more may be used according to the thickness of the structure desired. I have shown in Fig. II, a piece of material having two such meshes embedded in it. In this figure the portion marked 10, is of full thickness. At 11, a portion of one side has been torn away to disclose the first wire mesh 12. At 13, this wire mesh and a further portion of the embedding substance has been torn away to expose the second wire mesh 14, it will be noticed that for the purpose of increasing the strength of the material, the joints of the two meshes are arranged in staggered relation, to each other. In Fig. III, this same material is shown in section, 12, and 14, representing the wires of the two meshes.

Owing to the pulpy nature of the layers of which asbestos lumber is formed, and owing to the extreme pressure to which the product is subjected, the surfaces of the material, even though quite thin, exhibit little or no indication of the existence of the embedded mesh. The mesh does however markedly increase the strength of the material and also its durability.

Having thus described my invention, I claim:—

1. A structural material formed by the successive superimposition of very thin continuous pulpy layers of combined hydraulic cement and asbestos fiber, and having a wire mesh embedded between certain of these thin layers.

2. The process of forming a reinforced sheet of asbestos lumber, which consists in first mixing asbestos fibers and hydraulic cement in the presence of a great bulk of water, then forming therefrom a series of thin layers of the mixed cement and asbestos, superposed on each other, whereby the fibers of the asbestos will be positioned flat upon each other, embedding a layer of wire mesh between consecutive layers of the pulp before they are set, then pressing the same and allowing the material to set or harden.

3. The process of forming reinforced sheets of asbestos lumber, which consists in first mixing asbestos fibers and hydraulic cement in the presence of a great bulk of water, then forming a cylinder by the successive superimposition of thin continuous layers of the watery mixture, embedding a layer of wire mesh between consecutive layers of the pulp with the ends of the wire mesh slightly spaced from each other, cutting said cylinder between the spaced ends of the wire mesh, flattening out the layers thus superimposed, and subjecting them to pressure and allowing the same to set.

In witness whereof, I have hereunto signed my name, at Philadelphia in the State of Pennsylvania this tenth day of June 1905.

CHARLES E. WADE.

Witnesses:
JAMES H. BELL,
H. L. TAGGART.